US010128617B2

(12) United States Patent
Rosenberger

(10) Patent No.: US 10,128,617 B2
(45) Date of Patent: Nov. 13, 2018

(54) ANGLE CONNECTOR FOR DIFFERENTIAL TRANSMISSION OF DATA SIGNALS

(71) Applicant: ROSENBERGER HOCHFREQUENZTECHNIK GMBH & CO. KG, Fridolfing (DE)

(72) Inventor: Bernd Rosenberger, Tittmoning (DE)

(73) Assignee: Rosenberger Hochfrequenztechnik GmbH & Co. KG, Fridolfing (DE)

( * ) Notice: Subject to any disclaimer, the term of this patent is extended or adjusted under 35 U.S.C. 154(b) by 0 days.

(21) Appl. No.: 15/531,082

(22) PCT Filed: Nov. 17, 2015

(86) PCT No.: PCT/EP2015/002297
§ 371 (c)(1),
(2) Date: May 26, 2017

(87) PCT Pub. No.: WO2016/082920
PCT Pub. Date: Jun. 2, 2016

(65) Prior Publication Data
US 2017/0331228 A1 Nov. 16, 2017

(30) Foreign Application Priority Data
Nov. 28, 2014 (DE) .................... 20 2014 009 499 U

(51) Int. Cl.
H01B 11/04 (2006.01)
H01R 13/6467 (2011.01)
(52) U.S. Cl.
CPC ................ H01R 13/6467 (2013.01)
(58) Field of Classification Search
CPC .............................. H01B 11/002; H01B 11/04

USPC ................................................ 174/27, 113 R
See application file for complete search history.

(56) References Cited

U.S. PATENT DOCUMENTS 6,809,256 B2 * 10/2004 Garland ................ H01B 3/441
174/102 R
2012/0289095 A1 11/2012 Kirk

FOREIGN PATENT DOCUMENTS

DE 202014008844 U1 11/2014

* cited by examiner

Primary Examiner — Chau N Nguyen
(74) Attorney, Agent, or Firm — DeLio, Peterson & Curcio, LLC; Robert Curcio

(57) ABSTRACT

An angle connector for differential transmission of data signals, having first and second conductor pair ends in a first and second flat angle connector end surface, respectively, wherein the connector end surfaces are tilted spatially relative to one another, wherein, between the angle connector end surfaces, the angle connector has at least one first curved section in which all conductors of the conductor pair(s) are arranged with the respective longitudinal axes parallel to one another and all longitudinal axes follow a curved line, wherein in the first curved section, the longitudinal axes of at least one conductor pair follow differently curved lines, which are curved to varying degrees in such a way that, in the first curved section, two conductors have different geometric lengths relative to one another, wherein the angle connector has at least one second section in which all conductors of the conductor pair(s) are twisted for a predetermined fraction of a lay length in such a way that all conductors of the conductor pair(s) have an identical geometric length.

16 Claims, 2 Drawing Sheets

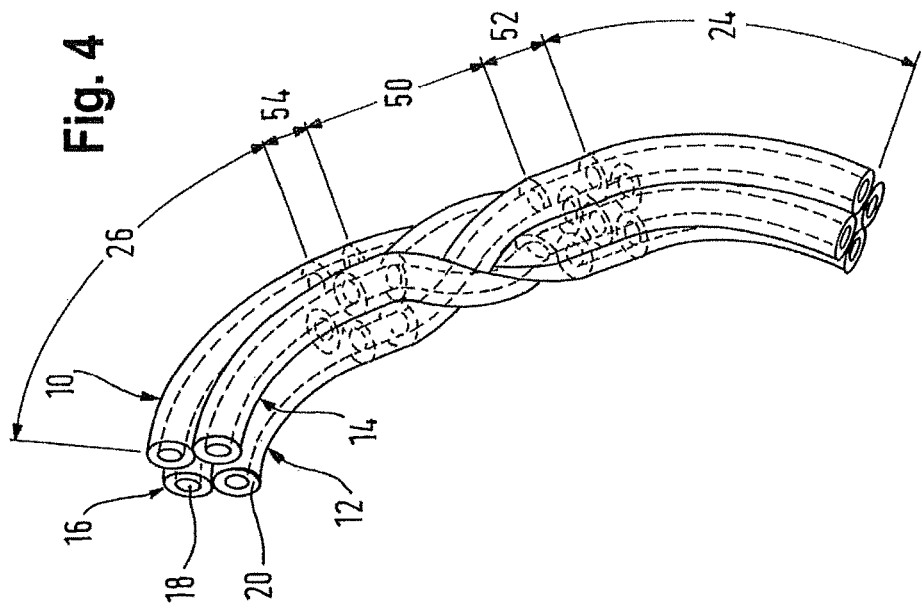
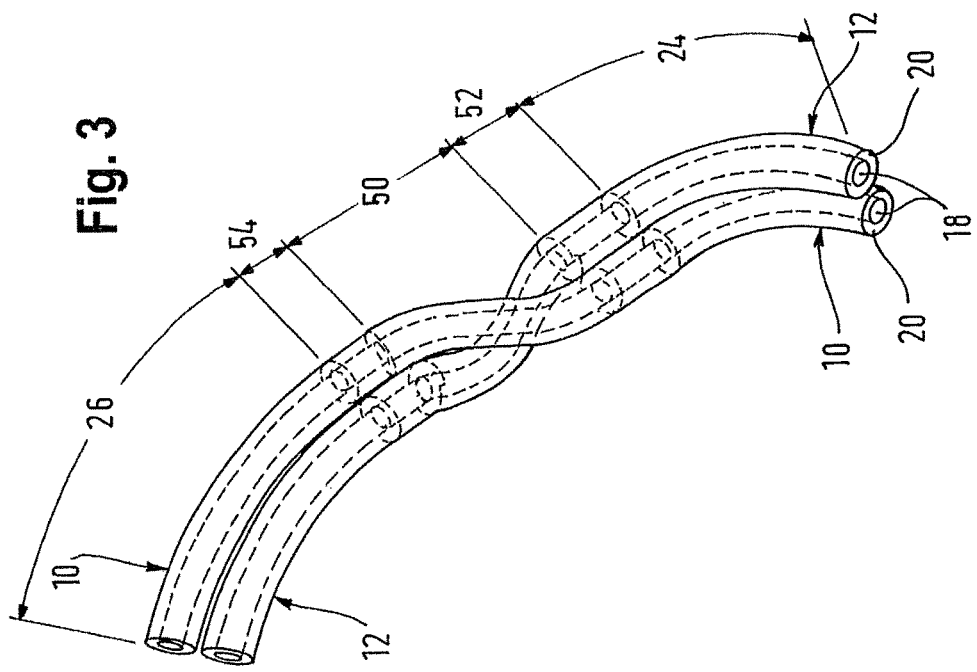

ANGLE CONNECTOR FOR DIFFERENTIAL TRANSMISSION OF DATA SIGNALS

BACKGROUND OF THE INVENTION

1. Field of the Invention

The present invention relates to angle connectors for computer systems, and more specifically to improving an angle connector such that high bandwidths and bit rates are achieved during the transmission of high-frequency signals via the angle connector.

2. Description of Related Art

In large computer systems it is usual that several processor boards, each forming a server, in the form of populated printed circuit boards, also known as "blades", are connected electrically and mechanically via plug-in slots with a so-called "backplane", which is itself also a populated printed circuit board. For this purpose, angle connectors are provided which establish contact between plug connectors or connection points on the blades on the one hand and plug connectors or connection points on the backplane on the other hand in order to establish corresponding data transmission channels between the respective blade and the associated backplane.

However, the electrical connection via the angle connector gives rise to various different problems which affect the high-frequency signal transmission properties of the electrical connections. For example, the conductors in the printed circuit board plug connectors should all have an identical impedance of 85 Ohm. However, due to the geometric circumstances, not all conductors in an angle plug connector have an identical geometric length, if these are arranged directly on the shortest paths running from the first plane to the second. However, phase differences in the transmission of high-frequency signals via the conductors of the angle connector need to be avoided, for which reason the conductors are frequently laid in a wavelike manner within the angle connectors, so that all conductors have an identical geometric length and thus also electric length. However, this has the disadvantage that the desired characteristic impedance of 85 Ohm is not present at each point between two adjacent conductors due to the distance changing in a wavelike manner Since the conductors within a printed circuit board plug connector influence one another, for example during the differential transmission of high-frequency signals, this changing characteristic impedance over the course of the conductors leads to significant limitations in terms of the maximum transmittable bandwidth and bit rate.

The invention is based on the problem of improving an angle connector of the aforementioned type such that high bandwidths and bit rates are achieved during the transmission of high-frequency signals via the angle connector.

SUMMARY OF THE INVENTION

According to the invention, this problem is solved through an angle connector of the aforementioned type with the characterizing features of the independent claims. Advantageous embodiments of the invention are described in the further dependent claims.

The above and other objects, which will be apparent to those skilled in the art, are achieved in the present invention which is directed to an angle connector comprising at least one conductor pair for differential transmission of data signals, wherein each conductor pair ends with a first conductor pair end in a first flat angle connector end surface and with a second conductor pair end in a second flat angle connector end surface, wherein the first and second angle connector end surfaces are tilted spatially relative to one another at a predetermined angle $\alpha$, such that between the first and the second angle connector end surfaces, the angle connector has at least one first curved section in which all conductors of the conductor pair(s) are arranged with respective longitudinal axes thereof parallel to one another and all longitudinal axes of all conductors of the conductor pair(s) follow a curved line, wherein in the first curved section, the longitudinal axes of the conductors of at least one conductor pair follow differently curved lines, which are curved to varying degrees for the two conductors of said conductor pair in such a way that, in the first curved section, said two conductors have different geometric lengths relative to one another, wherein the angle connector has at least one second section in which all conductors of die conductor pair(s) are twisted with one another for a predetermined fraction of a lay length and at a predetermined pitch in such a way that, starting from the first angle connector end surface to the second angle connector end surface, all conductors of the conductor pair(s) have an identical geometric length.

The two first curved sections are identical in terms of the curvature of the lines, wherein the stranding amounts to half a lay length and the second section is arranged between the two first curved sections, wherein the first curved sections, in each case starting out from the second section, are curved in opposite directions.

All conductors of the conductor pair(s) may each follow a respective circular arc, wherein in the first curved section the longitudinal axes of the conductors of at least one conductor pair each follow a respective circular arc with different radius and identical center point as well as identical center angle.

The two first curved sections may be identical in terms of the center angle and the radii of the respective conductors, wherein the stranding amounts to half a lay length and the second section is arranged between the two first curved sections, wherein the first curved sections, in each case starting out from second section, are curved in opposite directions.

The angle connector end surfaces may be tilted relative to one another at an angle of $\alpha=90°$, wherein the conductors in each case have a center angle of 45° in the two curved sections.

The total of all center angles of a conductor between the first and the second angle connector end surface may correspond to the angle $\alpha$.

The second section is formed in a straight line or is curved.

The predetermined angle $\alpha$ as a value in the range $0°<\alpha<360°$.

Two conductor pairs may be arranged in the angle connector, wherein the conductors of the conductor pairs are arranged in the stranded section in the form of a star quad arrangement.

The angle connector contains at least one section running in a straight line in which all conductors of the conductor pair(s) are arranged with their respective longitudinal axes parallel to one another and run in a straight line.

The curvature of the lines in the first section is constant or variable.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 3 shows a perspective view of only the coated conductors of the angle connector according to FIG. 1; and FIG. 4 shows a perspective view of only the coated conductors of an alternative embodiment of an angle connector according to the invention.

DESCRIPTION OF THE PREFERRED EMBODIMENT(S)

Figure 1:
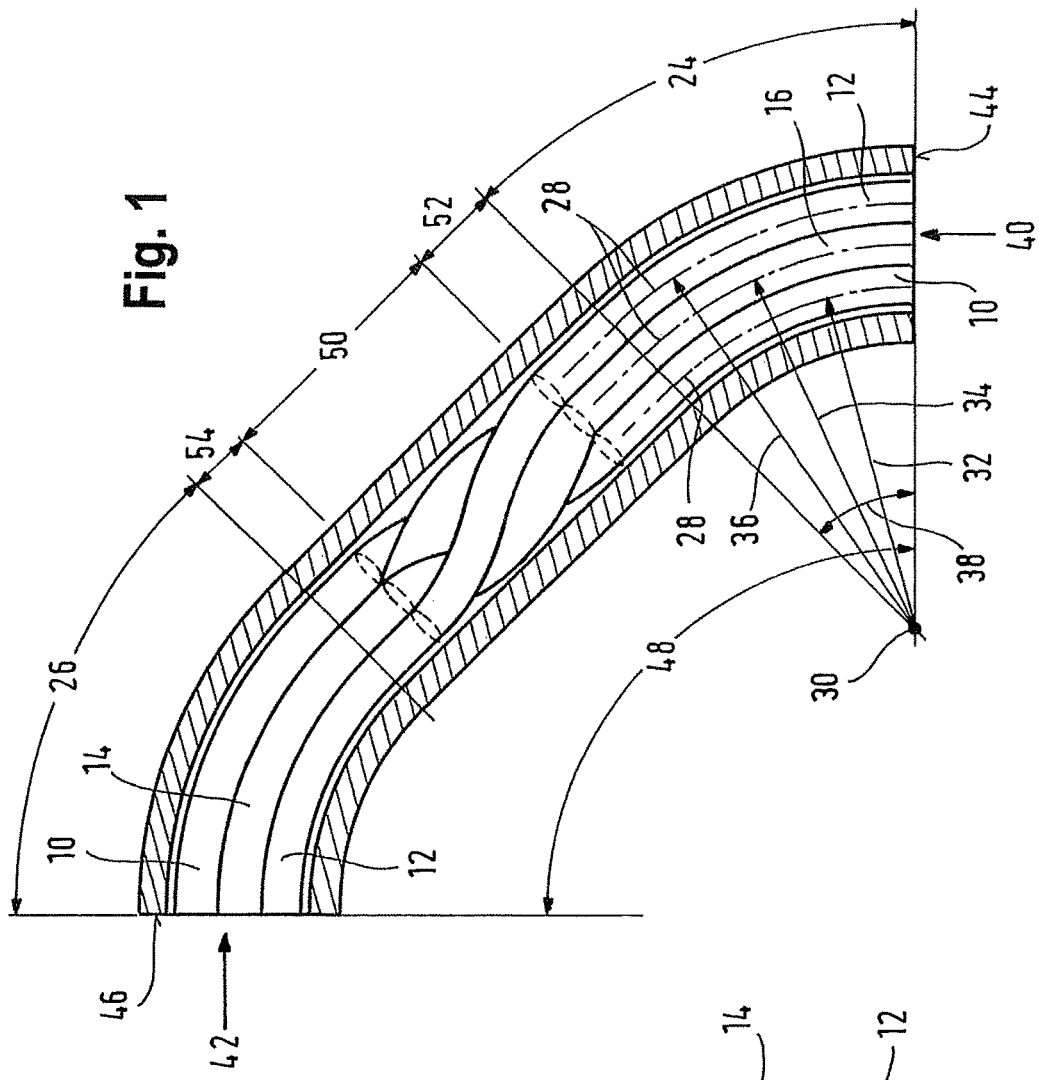
FIG. 1 shows a preferred embodiment of an angle connector according to the invention with two conductor pairs in a side view.

In describing the preferred embodiment of the present invention, reference will be made herein to FIGS. 1-4 of the drawings in which like numerals refer to like features of the invention.

According to the invention, in an angle connector of the aforementioned type, between the first and second angle connector end surfaces the angle connector has at least one first curved section in which all conductors of the conductor pair(s) are arranged with the respective longitudinal axes thereof parallel to one another and all longitudinal axes of all conductors of the conductor pair(s) follow a curved line, wherein in the first curved section, the longitudinal axes of the conductors of at least one conductor pair follow curved lines which are curved to varying degrees for the two conductors of said conductor pair in such a way that, in the first curved section, said two conductors have different geometric lengths relative to one another, wherein the angle connector has at least one second section in which all conductors of the conductor pair(s) are stranded with one another for a predetermined fraction of a lay length and at a predetermined pitch in such a way that, starting from the first angle connector end surface to the second angle connector end surface, all conductors of the conductor pair(s) have an identical geometric length.

This has the advantage that, with minimal spatial extension of the angle connector, a high channel density or packing density is achieved in combination with good decoupling between the individual channels or conductor pairs, wherein at the same time a runtime of signals over all conductors is substantially identical. A so-called "skew-matching" outside of the angle connector, for example a circuit board connected electrically and mechanically with the angle connector, can be dispensed with, as a result of which losses in the signal transmission are reduced. At the same time the angle connector has a constant, predetermined impedance at each point between the first and second angle connector end surfaces.

A particularly simple and functionally reliable geometric length compensation for all conductors is achieved in that two first curved sections are provided which are identical in terms of the curvature of the lines, wherein the stranding amounts to half a lay length and the second section is arranged between the two first curved sections, wherein the first curved sections, in each case starting out from the second section, are curved in opposite directions. Due to the stranding, the conductors swap over the curved lines which they follow, so that, in one of first curved sections, that conductor follows the geometrically longer curved line which in the other first curved section followed the geometrically shorter line and, conversely, in one of first curved sections, that conductor follows the geometrically shorter curved line which in the other first curved section followed the geometrically longer line, so that over all the differences in geometric length are cancelled out over the two first curved sections and, considered over the entire angle connector, all conductors have an identical geometric length.

An angle connector of particularly simple geometric design is achieved in that all conductors of the conductor pair(s) each follow a respective circular arc, wherein in the first curved section the longitudinal axes of the conductors of at least one conductor pair each follow a respective circular arc with different radius and identical center point as well as identical center angle.

A structure which is particularly simple in geometric terms is achieved in that two first curved sections are provided which are identical in terms of the center angle and the radii of the respective conductors, wherein the stranding amounts to half a lay length and the second section is arranged between the two first curved sections, wherein the first curved sections, in each case starting out from the second section, are curved in opposite directions.

A right-angled angle connector is achieved in that the angle connector end surfaces are tilted relative to one another at an angle of $\alpha=90°$, wherein the conductors in the two curved sections in each case have a center angle of 45°.

A geometrically correct structure and tension-free installation of the angle connector is achieved in that the total of all center angles of a conductor between the first and the second angle connector end surface corresponds to the angle $\alpha$.

A particularly simple stranding, in construction terms, which is easy to manufacture is achieved in that the second section is formed in a straight line. A particularly good adaptation of the construction space of the angle connector to corresponding limiting conditions in the immediate surroundings of the angle connector is achieved in that the second section is curved.

A connection via the angle connector of two connection points which are not arranged parallel to one another is achieved in that the predetermined angle $\alpha$ has a value in the range $0°<\alpha<360°$.

A particularly good electromagnetic decoupling of the signal transmission channels is achieved in that two conductor pairs are arranged in the angle connector, wherein the conductors of the conductor pairs are arranged in the stranded section in the form of a star quad arrangement.

A corresponding adaptation of the construction space of the angle connector to corresponding limiting conditions in the immediate surroundings of the angle connector as well as to the position of the connection points to be connected with the angle connector is achieved in that the angle connector has at least one section running in a straight line in which the respective longitudinal axes of all the conductors of the conductor pair(s) are arranged parallel to one another and run in a straight line.

A particularly good adaptation of the angle connector to a given installation situation is achieved in that the curvature of the lines in the first section is constant or variable.

Figure 2:
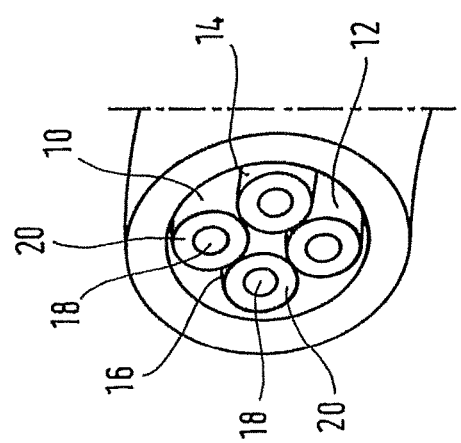
FIG. 2 shows a perspective view of an angle connector end surface of the angle connector according to FIG. 1.

The angle connector illustrated in FIGS. 1 to 3 comprises a first conductor pair with electrical conductors 10 and 12 as well as a second conductor pair with electrical conductors 14 and 16. The conductors 10, 12, 14, 16 are arranged in the manner of a star quad cable such that, viewed in cross section, the conductors are located at the corners of a rectangle, as can be seen from FIG. 2 in particular. Each conductor 10, 12, 14, 16 comprises a copper wire 18 with a diameter of for example 0.3 mm as well as a coating 20, for example of Teflon. The four conductors 10, 12, 14 and 16 are embedded in a dielectric, which for example has a diameter of 1.7 mm. The dielectric is for example manufactured from the material polyoxymethylene (abbreviation: POM).

Each conductor pair 10/12 and 14/16 ends with a first conductor pair end 40 in a first, flat angle connector end surface 44 and with a second conductor pair end 42 in a second, flat angle connector end surface 46, wherein the first and second angle connector end surfaces 44, 46 are tilted spatially relative to one another at a predetermined angle α 48.

The angle connector according to FIGS. 1 to 3 has two curved first sections 24, 26 in which the respective longitudinal axes 28 of all conductors 10, 12, 14, 16 of the conductor pairs are arranged parallel to one another.

In the curved first section 24, all longitudinal axes 28 of all conductors 10, 12, 14, 16 of the conductor pairs in each case follow a respective circular arc with a center point 30, a radius $R_1$ 32, $R_2$ 34, $R_3$ 36 and a center angle 38. All longitudinal axes 28 in each case follow a circular arc with identical center point 30 and identical center angle 38, but in some cases different radius $R_1$ 32, $R_2$ 34, $R_3$ 36. For example, the longitudinal axes 28 of the conductors 14, 16 of one conductor pair follow a circular arc with identical radius $R_2$ 34. In contrast, the conductors 10 and 12 of the other conductor pair in each case follow a circular arc with different radius. The conductor 10 follows a circular arc with the radius $R_1$ 32 and the conductor 12 follows a circular arc with the radius $R_3$ 36. In other words, the conductor 10 runs on an inner path in the curved first section 24, while the conductor 12 runs on an outer path. Accordingly, the conductors 10 and 12 have a different geometric length in the curved first section 24.

As can be seen from FIG. 1, the angle connector according to the invention connects two angle connector end surfaces 44 and 46 which are tilted relative to one another by an angle α=90°. The curved first section 24 has a center angle 38 of 45°. Accordingly, the other (second) curved first section 26 must also have a center angle 38 of 45° in order for the second end surface 46 to be reached. Also, the other (second) curved first section 26 must be curved in the same direction in order for the two center angles of the curved first sections 24 and 26 of in each case 45° to add up to a total angle of 90°.

If the conductors 10 and 12 hereby remained unchanged in their position, then once again the conductor 10 would run on the inner path (inner circular arc) with the smaller radius $R_1$ 32 and the conductor 12 would run on the outer path (outer circular arc). Overall, the geometric length of the conductor 10, considered from the first end surface 44 to second end surface 46, would be significantly shorter than the geometric length of the conductor 12 in this region. This would lead to undesired runtime differences of electrical signals being transmitted via the conductors 10 and 12.

According to the invention, a second section 50 is provided in which the conductors 10, 12, 14, 16 are stranded with one another over a predetermined lay length in the manner of a star quad cable. In this section 50, the longitudinal axes 28 of the conductors 10, 12, 14, 16 do not run parallel to one another. In the exemplary embodiment according to FIGS. 1 to 3 the stranding amounts to half a lay length. As a result, all of the conductors 10, 12, 14, 16 change their position within the angle connector. Viewed in cross section, the conductors 10, 12, 14 and 16 hereby change their position by 180°. The change in position of the conductors 14, 16 leads, for both conductors 14, 16, to an identical geometric length of the circular arc in the curved first section 26 which both also already had in the curved first section 24. In this respect, for these conductors 14, 16 this means there is no difference between the two curved first sections 24, 26. However, this is not the case for the conductors 10, 12. As a result of the half lay length stranding the conductor 10 changes over to the outer path, i.e. on to the circular arc with the larger radius $R_3$ 36 and as a result of the half lay length stranding the conductor 12 changes over to the inner path, i.e. on to the circular arc with the smaller radius $R_1$ 32. As a result, the differences in the running length of the conductors 10, 12 between the two curved first sections 24, 26 are equalized and both conductors have an identical geometric length, starting out from the first end surface 44 to the second end surface 46.

The stranding in the second section 50 has the advantage that, as a result of the star quad arrangement, an identical impedance is achieved over the entire course of the second section 50. In other words, the compensation of the geometric length within the angle connector has no influence on the impedance. This remains constant over the entire angle connector. In addition, sections 52, 54 running in a straight line are formed in the angle connector in which the longitudinal axes 28 of all conductors 10, 12, 14, 16 run parallel. These do not cause any differences in geometric length between the conductors 10, 12, 14, 16 and are therefore neutral in this respect.

In the illustrated embodiment, the angle connector has two identical curved sections 24 and 26 running in the same direction and a section 50, 52, 54 between them running in a straight line. However, this is purely exemplary. It is also possible to provide only one curved section 24 and the section 50 with the stranding can also be curved. Only the proportion of the lay length in the stranding needs thereby to be adjusted such that an identical geometric length exists for all conductors 10, 12, 14, 16 between the first and second end surface 44, 46.

It is also possible for only one conductor pair 10, 12 to be provided, as illustrated in FIG. 4. Here too, as a result of the stranding in the second section 50 the conductors 10, 12 change over from the outer path to the inner path and vice versa, so that in total an identical geometric length for all conductors 10, 12 is achieved.

The stranding in the second section 50 is carried out with a predetermined pitch. The pitch corresponds to the length of a lay length, i.e., an axial length in which the conductors 10, 12, 14, 16 are stranded with one another once by 360°. In the first exemplary embodiment according to FIGS. 1 to 3, the pitch is twice the length of the second section 50.

The fraction of the lay length of the stranding depends on the extent of the difference in geometric length between two curved sections which needs to be compensated. Only if the two curved sections 24, 26 are identical, as in the exemplary embodiment according to FIGS. 1 to 3, does the pitch amount to half a lay length. If, for example, the center angle of the two curved sections 24, 26 is not identical, or if only one curved first section 24 is present and the second section 50 is additionally curved, a different fraction of the lay length will need to be used for the stranding.

In other words, the angle connector according to the invention has a first curved section 24 in which, due to the curvature of this first section, at least two conductors 10, 12 of a conductor pair have different geometric lengths in this first section. As a result of the stranding in the second section, the different geometric lengths are compensated, so that all conductors 10, 12, 14, 16 have an identical geometric length, considered over the entire length of the angle connector. The compensation is thereby attributable to a change in place of the conductors 10, 12, 14, 16 within the angle connector, so that the conductors have differences in geometric length complementary to those in the first curved section. The second section 50 can itself be curved and/or a further first section 26 can be provided with identical curvature to the first section 24.

The compensation through the stranding thereby offers the particular advantage that despite the change in place of the conductors 10, 12, 14, 16 within the angle connector no change in the impedance occurs in the region of the change in place of conductors, i.e., the region of the stranding; on the contrary, considered in any given sectional plane perpendicular to the angle connector, the impedance also has an identical constant value of for example 85 Ohm along the stranding, just as in the rest of the region of the angle connector without stranding. This is for example achieved through the arrangement of the conductors 10, 12, 14, 16 in the manner of a star quad cable at the corners of an imaginary square in the cross section of the angle connector.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. An angle connector comprising at least one conductor pair for differential transmission of data signals, wherein each conductor pair ends with a first conductor pair end in a first flat angle connector end surface and with a second conductor pair end in a second flat angle connector end surface, wherein the first and second angle connector end surfaces are tilted spatially relative to one another at a predetermined angle $\alpha$, such that between the first and the second angle connector end surfaces, the angle connector has at least one first curved section in which all conductors of the at least one conductor pair are arranged with respective longitudinal axes thereof parallel to one another and all longitudinal axes of all conductors of the at least one conductor pair follow a curved line, wherein in the first curved section, the longitudinal axes of the conductors of the at least one conductor pair follow differently curved lines, which are curved to varying degrees for all conductors of said at least one conductor pair in such a way that, in the first curved section, said conductors have different geometric lengths relative to one another, wherein the angle connector has at least one second section in which all conductors of the at least one conductor pair are twisted with one another for a predetermined fraction of a lay length and at a predetermined pitch in such a way that, starting from the first angle connector end surface to the second angle connector end surface, all conductors of the at least one conductor pair have an identical geometric length.

2. The angle connector of claim 1, wherein two first curved sections are identical in terms of the curvature of the lines, wherein the stranding amounts to half a lay length and the second section is arranged between the two first curved sections, wherein the first curved sections, in each case starting out from the second section, are curved in opposite directions.

3. The angle connector of claim 1, wherein all conductors of the at least one conductor pair each follow a respective circular arc, wherein in the first curved section the longitudinal axes of the conductors of at least one conductor pair each follow a respective circular arc with different radius and identical center point as well as identical center angle.

4. The angle connector of claim 2, wherein the two first curved sections are identical in terms of the center angle and the radii of the respective conductors, wherein the stranding amounts to half a lay length and the second section is arranged between the two first curved sections, wherein the first curved sections, in each case starting out from second section, are curved in opposite directions.

5. The angle connector of claim 4, wherein the angle connector end surfaces are tilted relative to one another at an angle of $\alpha=90°$, wherein the conductors in each case have a center angle of 45° in the two curved sections.

6. The angle connector of claim 3, wherein the total of all center angles of a conductor of the conductors between the first and the second angle connector end surface corresponds to the angle $\alpha$.

7. The angle connector of claim 1 wherein the second section is formed in a straight line or is curved.

8. The angle connector of claim 1 wherein the predetermined angle $\alpha$ as a value in the range $0°<\alpha<360°$.

9. The angle connector of claim 1 wherein the at least one conductor pair and a further conductor pair are arranged in the angle connector, wherein the conductors of these conductor pairs are arranged in the stranded section in the form of a star quad arrangement.

10. The angle connector of claim 1 wherein the angle connector contains at least one section running in a straight line in which all conductors of the at least one conductor pair are arranged with their respective longitudinal axes parallel to one another and run in a straight line.

11. The angle connector of claim 1 wherein the curvature of the lines in the first curved section is constant or variable.

12. The angle connector of claim 2, wherein all conductors of the at least one conductor pair each follow a respective circular arc, wherein in the first curved section the longitudinal axes of the conductors of at least one conductor pair each follow a respective circular arc with different radius and identical center point as well as identical center angle.

13. The angle connector of claim 3, wherein two first curved sections are identical in terms of the center angle and the radii of the respective conductors, wherein the stranding amounts to half a lay length and the second section is arranged between the two first curved sections, wherein the first curved sections, in each case starting out from second section, are curved in opposite directions.

14. The angle connector of claim 5, wherein the total of all center angles of a conductor of the conductors between the first and the second angle connector end surface corresponds to the angle $\alpha$.

15. The angle connector of claim 13 wherein the at least one conductor pair and a further conductor pair are arranged in the angle connector, wherein the conductors of these conductor pairs are arranged in the stranded section in the form of a star quad arrangement.

16. The angle connector of claim 14 wherein the angle connector contains at least one section running in a straight line in which all conductors of the at least one conductor pair are arranged with their respective longitudinal axes parallel to one another and run in a straight line.

\* \* \* \* \*